UNITED STATES PATENT OFFICE.

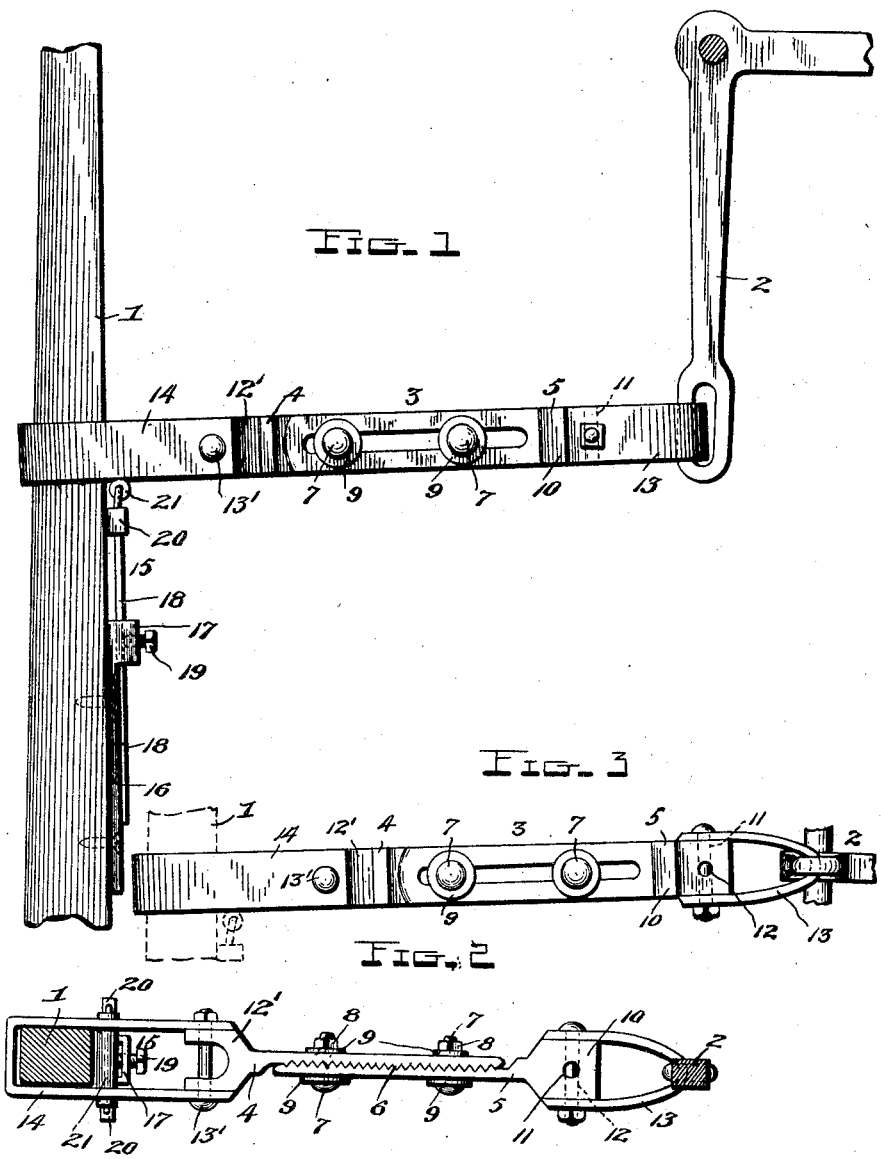

CHARLES FABER, OF FALL RIVER, MASSACHUSETTS.

PICKER-STICK STRAP.

SPECIFICATION forming part of Letters Patent No. 707,406, dated August 19, 1902.

Application filed February 6, 1902. Serial No. 92,832. (No model.)

*To all whom it may concern:*

Be it known that I, CHARLES FABER, a citizen of the United States, residing at Fall River, in the county of Bristol and State of Massachusetts, have invented certain new and useful Improvements in Picker-Stick Straps; and I do declare the following to be a full, clear, and exact description of the invention, such as will enable others skilled in the art to which it appertains to make and use the same.

The invention relates to a picker-stick strap which connects the picker-stick of a loom and the mechanism by which a reciprocating movement is imparted to said stick.

The object of the invention is to provide a metallic picker-stick strap which shall be simple of construction, durable in use, comparatively inexpensive of production, and which will serve as a substitute for the picker-stick straps of canvas, leather, and like materials so commonly employed.

With this and other objects in view the invention consists of certain novel features of construction, combination, and arrangement of parts, which will be hereinafter more fully described, and particularly pointed out in the appended claims.

In the accompanying drawings, Figure 1 is a side view of a portion of the picker-stick, the rocker-arm, and the strap connecting the picker-stick to the rocking arm; and Fig. 2 is a top plan view of the same parts. Fig. 3 is a side view of the strap, showing the relation of its yoke or loop thereto when engaged with a horizontally-swinging rocker-arm.

Referring to the drawings, 1 denotes the picker-stick, 2 the rocker-arm, and 3 the strap connecting the rocker-arm to the picker-stick by which movement is transmitted from the former to the latter.

The strap preferably consists of two longitudinal slotted bars 4 and 5, the inner faces of which are provided with interlocking serrations 6. These bars are held together in longitudinal adjustment by bolts 7, passed through the slots therein and provided with nuts and washers 8 and 9, respectively. The outer end of one bar is provided with a solid head 10, having a vertically-disposed aperture 11 and a transversely-disposed aperture 12. The outer end of the other bar is provided with a forked head 12', to which is secured by a bolt 13' a loop or yoke 14, which is adapted to receive the picker-stick.

13 denotes a yoke or loop which is secured to the head 10 when the rocker-arm is mounted, as shown in Fig. 1, to swing in a vertical plane by a bolt passing through the transverse aperture. When the rocker-arm is mounted to swing in a horizontal plane, the yoke or loop is secured to the head 10 by a bolt passing through the vertical aperture. This yoke or loop has a link connection with the rocker-arm, as more clearly shown in Fig. 1.

15 denotes a support for the loop or yoke 14 and consists of a bar 16, bolted or otherwise secured to the picker-stick and provided with a sleeve 17 at its outer end through which projects a bar 18, which is secured in vertical adjustment by a set-screw 19. The upper end of the bar 18 is provided with a transversely-disposed head 20, having connected thereto a roller 21, with which the lower edge of the loop or yoke 14 engages and by means of which that end of the strap is supported in proper relation to the picker-stick. The support 15 serves as a substitute for the hanger-strap now so commonly employed for connecting the picker-stick strap to the picker-stick.

When it is desired to change the throw of the picker-stick, the two-part strap is adjusted the desired length and the bar 18 moved upwardly or downwardly—upwardly to lessen the distance of the throw of the picker-stick and downwardly to increase the distance of the throw—and then secured in its adjusted position by the set-screw. These adjustments—that is, the adjustments of the strap and of the support—may be easily and expeditiously effected.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. A picker-stick strap for looms, comprising longitudinally-adjustable parts formed at their outer ends with heads, one of which is formed with vertical and transverse apertures and the other with a transverse aperture, means for locking said parts in adjusted position, a yoke, a bolt for engagement with either the transverse or vertical aperture located in the head, whereby the yoke may be attached to a horizontal or vertical swinging rocker-arm of the loom, and a second yoke bolted to the other head and adapted to engage the picker-stick, substantially as set forth.

2. A picker-stick for looms having one end provided with vertical and transverse apertures, of a yoke, a bolt for engagement with either the transverse or vertical aperture, whereby the yoke may be attached to a vertical or horizontal swinging rocker-arm of a loom, substantially as set forth.

In testimony whereof I have hereunto set my hand in presence of two subscribing witnesses.

CHARLES $\overset{\text{his}}{\times}$ FABER.
$\phantom{CHARLES\ \ }$ mark

Witnesses:
LOUIS P. TALBOT,
OSCAR BOUSQUET.